Figure 2:
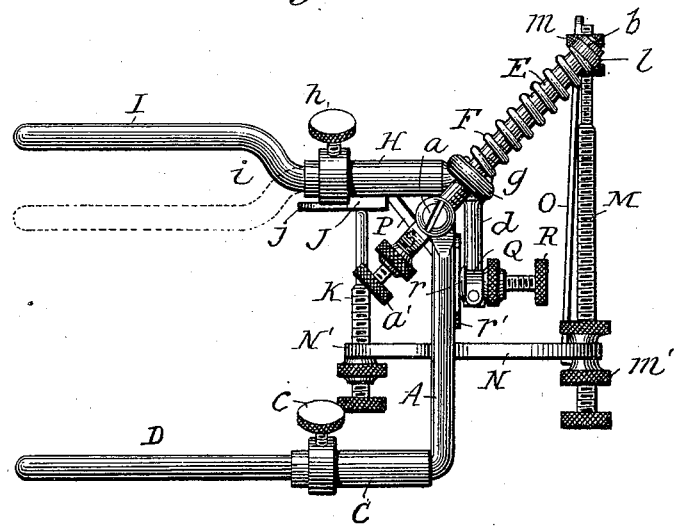

(No Model.)  2 Sheets—Sheet 1.
W. E. WALKER.
DENTAL ARTICULATOR.
No. 566,949. Patented Sept. 1, 1896.
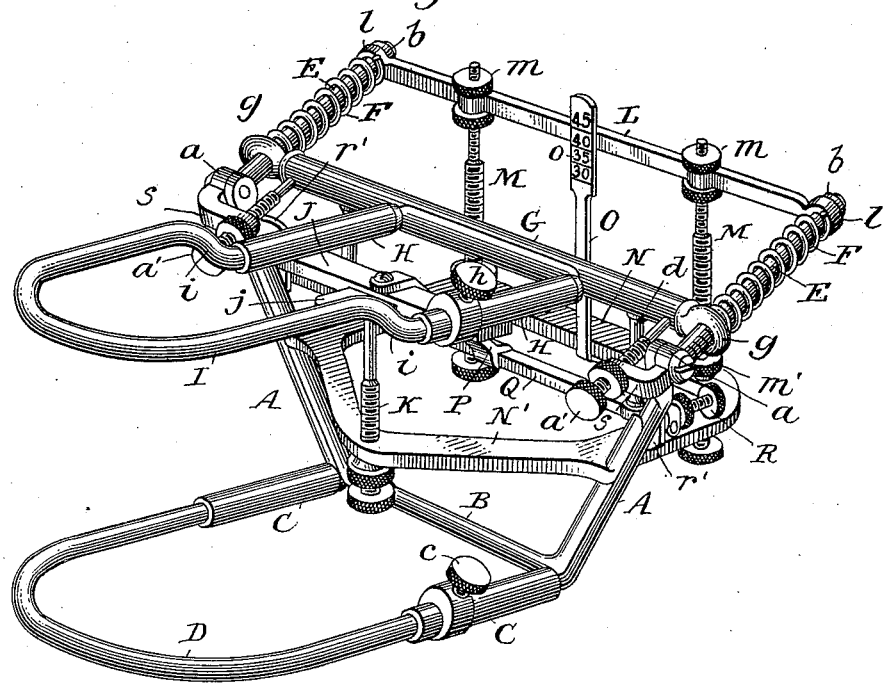
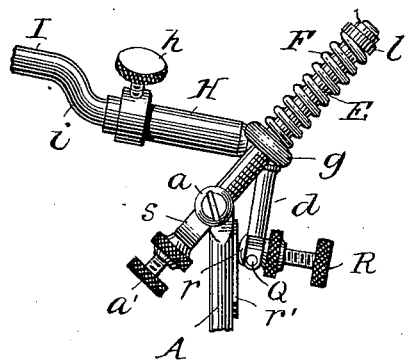
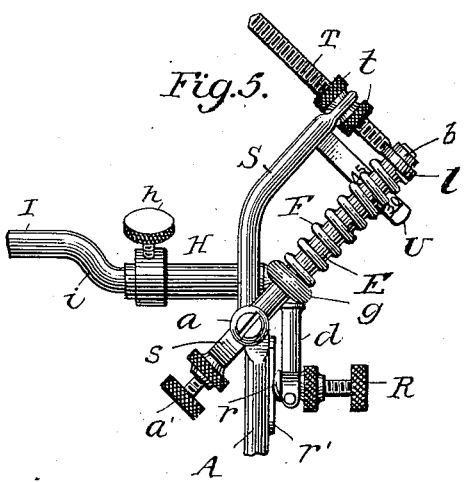
Witnesses
Jno. G. Hinkel
Adene Williams
Inventor
William E. Walker
by D. A. McKnight,
Attorney (No Model.)

2 Sheets—Sheet 2.

W. E. WALKER.
DENTAL ARTICULATOR.

No. 566,949. Patented Sept. 1, 1896.

Witnesses
Jno. G. Hinkel
Adene Williams

Inventor
William E. Walker
by D. A. M. Knight,
Attorney

UNITED STATES PATENT OFFICE.

WILLIAM ERNEST WALKER, OF PASS CHRISTIAN, MISSISSIPPI.

DENTAL ARTICULATOR.

SPECIFICATION forming part of Letters Patent No. 566,949, dated September 1, 1896.

Application filed November 6, 1895. Serial No. 568,146. (No model.)

*To all whom it may concern:*

Be it known that I, WILLIAM ERNEST WALKER, a citizen of the United States, residing at Pass Christian, in the county of Harrison and State of Mississippi, have invented certain new and useful Improvements in Dental Articulators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in dental articulators; and it consists in the mechanism described hereinafter, and illustrated in the drawings, for assimilating the movements of the jaw-models more closely to those of the human jaws, and for regulating and registering their motion, relation, and position conformably to those of the patient.

It has been discovered that the human jaw in opening and closing does not turn upon its condyles as upon fixed pivots, and that when moving forward or backward or laterally its condyles do not describe horizontal lines, but that, by reason of the downward and forward inclination of the roof of the glenoid fossæ, the condyles in every change of the jaw's position move in a line at an angle with the mean of the curved line of occlusion of the teeth. By means of a dental clinometer for measuring this angular motion and comparing it with other angles of the face, which I have devised, it is found that the course traversed by the human condyles in their movements during biting and mastication is a straight line, made so apparently by the overlying tissues in the glenoid fossæ, and that the angle which this course makes with a plane passing through the mean of the curved line of occlusion of the teeth ranges from fifteen degrees to forty-five degrees in different persons, having an average value of thirty-five degrees, and that it not infrequently varies in the different sides of the same jaw. It is also found by experiment that this angular motion at the rear portion of the jaw governs the articulation of the natural teeth, and that it must be reproduced in a dental articulator to permit the natural articulation of artificial teeth.

My invention is designed to accomplish these results, its principal object being the reproduction in an articulator of this angular motion of the human condyles, and its further objects being the provision of means for registering the angle in the individual case and varying the adjustment of the articulator accordingly. It is designed to be in every sense a physiological articulator. In an articulator so constructed and adjusted casts of a substantially perfect set of natural teeth with unimpaired cusps will articulate as perfectly as they do in the person's mouth; and I find that with an articulator so constructed and adjusted the dental prosthetist is enabled to correct a wrong bite without taking a new bite, and to so arrange, occlude, and articulate artificial teeth on the casts or models of the jaws that when the dentures are completed and placed in the mouth they will occlude and articulate in the same manner as do the natural teeth, and in any position in which the lower jaw may be placed, whether at rest, or protruded in biting, or in chewing on the right side or on the left, and with the result that their wearer can both bite and masticate food perfectly.

I may here state that in the human subject the average or typical mean line of occlusion of the teeth cuts the facial line at an angle of about seventy-five degrees, and that the course traversed by the condyles cuts it at an angle of about forty degrees, wherefore the condylar course forms an angle of about thirty-five degrees with the line of occlusion, as above stated. For convenience in mounting the models of the jaws on the articulator it is customary to so place them that the mean of the curved line of occlusion of the dentures is parallel with the base-line of the articulator, and such is the case in the articulator herein described, the lower tubes being parallel with the supposed base-line, wherefore the rearwardly-extending arms, which regulate the condylar motion of the articulator jaws, form the same angle with the base-line as their angle with the mean of the curved line of occlusion; but this arrangement of the parts is a mere matter of convenience, and I do not confine myself to it. Nor do I confine myself to two arms, or to an arm or arms extending rearwardly, or to arms of any kind, or to the specific arrangement of the parts embodying my discovery or the means of applying it herein shown or described.

Figure 3:
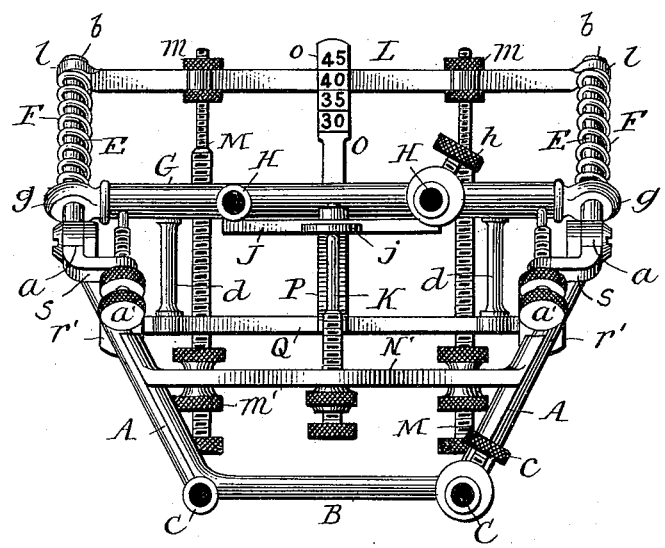

In the drawings, Figures 1, 2, and 3 are respectively a perspective, a side, and a front view of my articulator. Fig. 4 is a detail view of the joint of one of the arms, and Fig. 5 is a modified form of the mechanism for registering and changing the angle of motion.

The foundation of my articulator is the trilateral frame A B A, usually made of metal, and composed of horizontal bar B and the two vertical bars A and A, rigidly attached to the ends thereof, bar B carrying two forwardly-extending horizontal tubes C and C, adapted to receive and hold the ends of loop D, which supports the plaster model of the lower jaw, bars A carrying at their upper ends two backwardly-extending arms E and E, placed at an angle of about thirty-five degrees with the mean of the curved line of occlusion of the dentures, said arms carrying spiral springs F and F, whose upper ends rest against buttons $b$ and $b$, and whose lower ends rest against sliding rings $g$ and $g$, to which is attached rotating cross-bar G, carrying the two forwardly-extending tubes H and H, adapted to receive and hold the ends of loop I, which supports the plaster model of the upper jaw. In its simplest practical form my articulator consists of the parts just enumerated in their relationship substantially as described, the arms being fixed at the average angle of thirty-five degrees above referred to, or at any angle between fifteen and forty-five degrees, without means for varying said angle.

Loop I may be straight, like loop D, or bent at $i$, as shown, whereby the distance between the upper and lower jaws of the articulator may be correspondingly increased or diminished on parallel lines, as illustrated in Fig. 2. The loops are held in place by set-screws $c$ and $h$, respectively. Bar G is shown as rotating on pins (not visible) projecting from rings $g$; but this form is not essential, the only requisite being a cross-bar connecting said rings and so constructed that loop I, carried by it, can move freely round its axis.

The form of the frame may vary from that here described, and arms E may be slightly curved, if desired, so long as the mean line of their curve forms an angle of between fifteen and forty-five degrees with the mean line of occlusion. When bar G is moved backward at either or both ends, it also rises on arms E, and in moving forward it also descends on said arms, whereby the movements of the condyles in the glenoid fossæ of the human skull are closely approximated.

In the more complex form of my articulator I provide joints $a$ at the junction of arms E with frame A B A, which permit the angle of their inclination to be increased or diminished, as required by individual cases. A cross-bar L connects said arms at their rear extremities, its ends being sliding rings $l$ and $l$, which rest between springs F and buttons $b$, and passing loosely through openings in cross-bar L and horizontal frame N, and held in place by lock-nuts $m$ and $m'$ are rods M and M, whose office is to raise or lower said arms, as required, the angle being obtained from upright O, suitably attached to said frame and carrying gage-plate $o$ at its upper end, loosely resting against cross-bar L. To effect the above-described motion of the upper jaw of the articulator on the condyle-arms by the mere movement of the jaw, I provide cross-tie Q, depending from and rigidly attached to cross-bar G by rods $d$ and $d$, there passing through either end of bar Q the screw-pins R and R, having buttons $r$ and $r$ at their front ends, which rest against and slide upon plates $r'$ and $r'$, suitably attached to either side of frame A B A, and springing from the center of bar Q the tie-rod P, whose upper end is attached to cross-bar J, connecting tubes H and H, tubes H and bars G and Q being thus rigidly united, so that the movement of either must necessarily affect the other. By virtue of this construction when the articulator-jaws are moved the ends of screw-pins R act as a sliding fulcrum, and the resulting leverage forces bar G to slide up and down on arms E, as illustrated in Fig. 4.

N' is a projecting cross-piece attached to frame A B A and supports the screw-rod K, whose upper end is in contact with plate $j$, attached to cross-bar J, and its function is to regulate the distance between the jaws, as described. Two lugs $s$ and $s$ are attached to the ends of arms E at joints $a$ and support the screw-pins $a'$ and $a'$, whose upper ends are in contact with cross-bar G and whose function is to regulate the bite of the jaw-models. A gage is shown as marked on the side of arms E, its function being to record the distance to which bar G is pressed back and held by screw-pins $a'$.

In Fig. 5 is shown a modification of the above-described mechanism for changing the angle of the projecting arms, consisting of bent rods S and S, rigidly attached to frame A B A, provided with the gage U, and through the extremities of which pass levers T, attached to rings $l$ and fastened by lock-nuts $t$.

Having thus fully described my invention, what I claim, and desire to secure by Letters Patent, is—

1. The frame carrying the lower model-holder, the hinged arms extending rearwardly from the upper part of the frame, the cross-tie connecting the outer extremities of the arms with the rods for elevating and depressing it and the gage for measuring its angle with the mean of the curved line of occlusion of the models, the spring-pressed rotating cross-bar carrying the upper model-holder and adapted to slide on the arms with the gages for measuring its movements attached to the arms, the rods depending from and rigidly attached to the cross-bar and adapted to rest against and slide upon the frame, and the screw-pins for regulating the bite of the models attached to the lower part of the arms and resting against the cross-bar, substantially as and for the purposes described.

2. The frame carrying at its lower edge the lower model-holders and at its upper edge the rearwardly-extending hinged arms, rods attached to the frame for elevating and depressing the arms with gages for measuring their angle with the mean of the curved line of occlusion of the models, the spring-pressed rotating cross-bar adapted to slide on the arms and carrying the upper model-holders, and the screw-pins for regulating the bite of the models carried by the arms, substantially as and for the purposes described.

3. The lower model-holder carried by the lower part of the frame, the hinged arm or arms carried by the upper part of the frame, means for varying the angle of the arms with the mean of the curved line of occlusion of the models, the spring-pressed sliding cross-bar pivotally attached to the arms and carrying the upper model-holders, and the screw-pins for regulating the bite of the model-holders, substantially as and for the purposes described.

4. The frame, one model-holder rigidly attached thereto, the other model-holder pivotally attached thereto and adapted to slide back and forth on a jointed and vertically-adjustable extension from the frame, and means for positively adjusting the relative position of the two models in regulating the bite, substantially as and for the purposes described.

5. The frame, one model-holder rigidly attached thereto, the other model-holder pivotally attached thereto, and means for automatically moving the latter (without its being pivotally turned) at an angle with the mean of the curved line of occlusion of the models, substantially as and for the purposes described.

In testimony whereof I affix my signature in presence of two witnesses.

WILLIAM ERNEST WALKER.

Witnesses:
K. L. THORNTON,
J. M. WALKER.